United States Patent
Xi et al.

(10) Patent No.: US 10,629,148 B2
(45) Date of Patent: Apr. 21, 2020

(54) DISPLAY DEVICE AND CONTROL CIRCUIT

(71) Applicant: AU OPTRONICS CORPORATION, Hsin-chu (TW)

(72) Inventors: Peng-Bo Xi, Hsin-chu (TW); Sung-Yu Su, Hsin-chu (TW); Chen-Feng Fan, Hsin-chu (TW)

(73) Assignee: AU OPTRONICS CORPORATION, Tokyo (JP)

( * ) Notice: Subject to any disclaimer, the term of this patent is extended or adjusted under 35 U.S.C. 154(b) by 59 days.

(21) Appl. No.: 15/836,218

(22) Filed: Dec. 8, 2017

(65) Prior Publication Data

US 2018/0174540 A1 Jun. 21, 2018

(30) Foreign Application Priority Data

Dec. 20, 2016 (TW) .............................. 105142309 A (51) Int. Cl.
*G09G 3/36* (2006.01)
*G02F 1/139* (2006.01)
*G02F 1/1343* (2006.01)

(52) U.S. Cl.
CPC ........... *G09G 3/3674* (2013.01); *G02F 1/139* (2013.01); *G02F 1/1396* (2013.01); *G09G 3/3614* (2013.01); *G09G 3/3655* (2013.01); *G09G 3/3677* (2013.01); *G02F 2001/134381* (2013.01); *G09G 2300/0426* (2013.01)

(58) Field of Classification Search
CPC combination set(s) only.
See application file for complete search history.

(56) References Cited

U.S. PATENT DOCUMENTS

| | | |
|---|---|---|
| 8,542,171 B2 | 9/2013 | Huang et al. |
| 9,240,153 B2 | 1/2016 | Fujita |
| 9,583,064 B2 | 2/2017 | Wu |
| 2008/0106541 A1 | 5/2008 | Yamazaki |
| 2013/0093745 A1 | 4/2013 | Chen et al. |
| 2016/0313616 A1 | 10/2016 | Arai et al. |

FOREIGN PATENT DOCUMENTS

| | | |
|---|---|---|
| EP | 3093703 A1 | 11/2016 |
| TW | 200816156 A | 4/2008 |
| TW | 201317965 A | 5/2013 |

OTHER PUBLICATIONS

Office Action issued by (TIPO) Intellectual Property Office, Ministry of Economic Affairs, R. O. C. dated Jun. 9, 2017 for Application No. 105142309, Taiwan.

(Continued)

*Primary Examiner* — Robin J Mishler
(74) *Attorney, Agent, or Firm* — Tim Tingkang Xia, Esq.; Locke Lord LLP (57) ABSTRACT

A control circuit includes a switching circuit and a select circuit. The switching circuit is configured to receive a scan signal, a first switching signal, and a second switching signal, and output the first switching signal and the second switching signal according to the scan signal. The select circuit is configured to receive a first supply voltage, a second supply voltage, the first switching signal, and the second switching signal, and selectively output the first supply voltage or the second supply voltage to a target electrode according to the first switching signal and the second switching signal.

9 Claims, 8 Drawing Sheets

(56) References Cited

OTHER PUBLICATIONS

Office Action issued by (TIPO) Intellectual Property Office, Ministry of Economic Affairs, R. O. C. dated Jul. 28, 2017 for Application No. 105142309, Taiwan.
Office Action issued by the State Intellectual Property Office of the Peoples Republic of China dated Oct. 22, 2018 for Application No. CN201710080669.X.
Extended European Search Report issued by the European Patent Office (EPO) for EP Application No. 17208560.7 dated Mar. 12, 2018.

DISPLAY DEVICE AND CONTROL CIRCUIT

CROSS-REFERENCE TO RELATED PATENT APPLICATION

This application claims priority to and the benefit of, pursuant to 35 U.S.C. § 119(a), patent application Ser. No. 105142309 filed in Taiwan on Dec. 20, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

This application relates to a device and a circuit. Specifically, this application relates to a display device and a control circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the development of science and technology, display devices have been widely applied in life of people.

Generally, a liquid crystal display device may include multiple electrodes and a liquid crystal layer. The liquid crystal display device provides different voltages to the electrodes, so that an electric field is formed between the electrodes, to twist liquid crystal molecules in the liquid crystal layer. Display of the liquid crystal display device can be controlled by controlling twisting of the liquid crystal molecules.

Therefore, how to provide voltages to the electrodes to control twisting of the liquid crystal molecules becomes an important research issue in the art.

SUMMARY

An implementation aspect of this application relates to a display device. According to an embodiment of this application, the display device includes: multiple target electrodes, a scan circuit, a switching signal providing circuit, a supply voltage providing circuit, and a control circuit. The scan circuit is configured to sequentially output multiple scan signals in each of multiple frames. The switching signal providing circuit is configured to provide a first switching signal and a second switching signal, where in a first frame and a second frame in the frames, the first switching signal has different voltage levels, and the second switching signal has different voltage levels. The supply voltage providing circuit is configured to provide a first supply voltage and a second supply voltage. The control circuit is configured to receive a first scan signal in the scan signals, and output the first supply voltage to a first target electrode in the target electrodes in the first frame according to the first scan signal, the first switching signal, and the second switching signal, and configured to output the second supply voltage to the first target electrode in the second frame according to the first scan signal, the first switching signal, and the second switching signal.

Another implementation aspect of this application relates to a control circuit. According to an embodiment of this application, the control circuit includes: a switching circuit and a select circuit. The switching circuit is configured to receive a scan signal, a first switching signal, and a second switching signal, and configured to output the first switching signal and the second switching signal according to the scan signal. The select circuit is configured to receive a first supply voltage, a second supply voltage, and the first switching signal and the second switching signal from the switching circuit, and configured to selectively output the first supply voltage or the second supply voltage to a target electrode according to the first switching signal and the second switching signal.

By applying an embodiment above, a polarity of a target electrode can be reversed according to a scan signal.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The following clearly describes the spirit of the disclosure by using accompanying drawings and detailed descriptions. After learning embodiments of the disclosure, a person of ordinary skill in the art can make changes and modifications to the technologies demonstrated in the disclosure without departing from the spirit and scope of the disclosure.

The terms "first", "second", and the like used in this specification do not particularly indicate a sequence or an order, and are not used to limit this application, but only to distinguish between elements or operations described by using same technical words.

The term "electrically coupled" used in this specification may mean that two or more elements are in direct physical or electrical contact or indirect physical or electrical contact, and may further mean that two or more elements perform an operation or action on each other.

The terms "comprise", "include", "have", "contain", and the like used in this specification are all open terms, that is, mean including, but not limited to.

The term "and/or" used in this specification includes any one or a combination of described objects.

The directional terms used in this specification such as "on", "under", "left", "right", "front", and "back" indicate directions of the accompanying drawings. Therefore, the used directional terms are intended to illustrate rather than limit this application.

The terms used in this specification generally have a normal sense of each term that used in the art, in the disclosure, and in the specific content, unless specifically noted. Some terms used to describe the disclosure will be discussed below or elsewhere in this specification, so as to provide additional guidance to persons skilled in the art in addition to the description of the disclosure.

Figure 1:
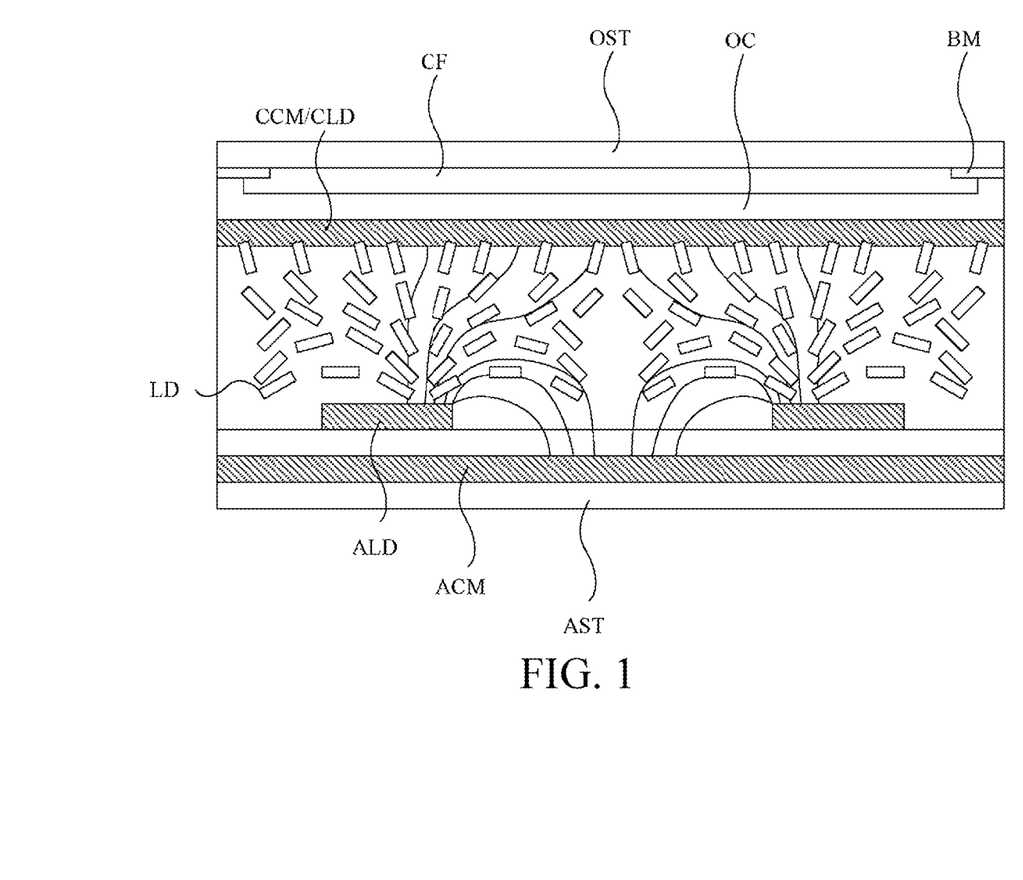
FIG. 1 is a schematic diagram of a display device according to an embodiment of this application.

Referring to FIG. 1, FIG. 1 is a schematic diagram of a display device according to an embodiment of this application. In this embodiment, the display device includes an array substrate AST and an opposite substrate OST. A pixel electrode ALD and an array common electrode ACM are disposed on the array substrate AST, and a color filter common electrode CCM, a color filter CF, a black matrix BM, and a protective layer OC are disposed on the opposite substrate OST. A liquid crystal layer is disposed between the array substrate AST and the opposite substrate OST, and has multiple liquid crystal molecules LDs.

An electric field formed between the pixel electrode ALD and the array common electrode ACM can control twisting of the liquid crystal molecules LDs, to change the amount of light passing through the liquid crystal layer. An electric field formed between the pixel electrode ALD and the color filter common electrode CCM can control tilting of the liquid crystal molecules LDs, to change the width of a view angle of the display device.

Figure 2:
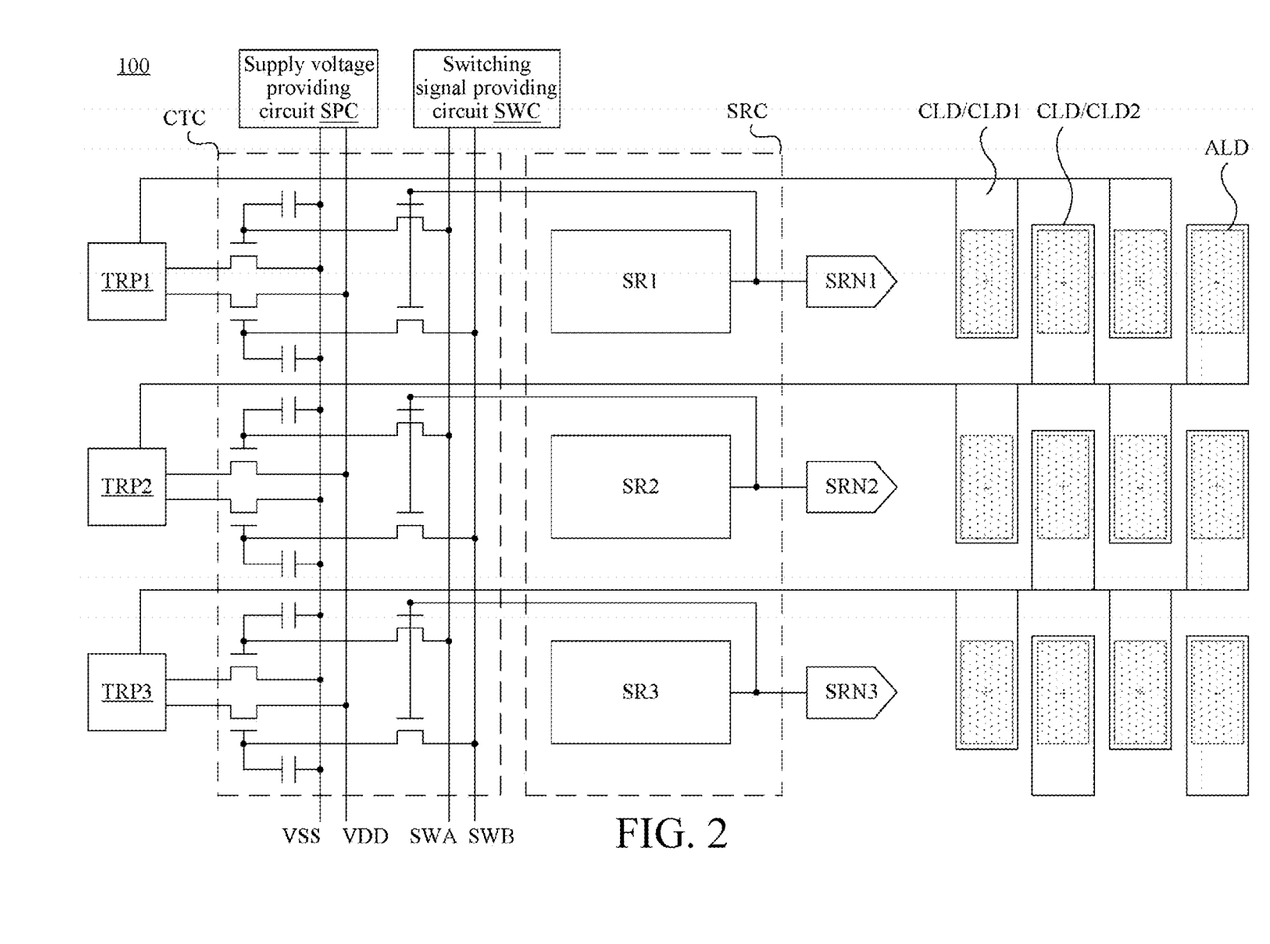
FIG. 2 is a schematic diagram of a display device according to an embodiment of this application.

Referring to FIG. 2, FIG. 2 is a schematic diagram of a display device 100 according to an embodiment of this application. In this embodiment, the display device 100 includes a scan circuit SRC, a switching signal providing circuit SWC, a supply voltage providing circuit SPC, a control circuit CTC, multiple target electrodes CLDs (which, for example, may be color filter common electrodes CCMs in FIG. 1), pixel electrode ALDs, conductive pads (for example, conductive pads TRP1, TRP2, and TRP3), and multiple pixel circuits (not shown) arranged as a matrix.

In an embodiment, the control circuit CTC is electrically connected to the scan circuit SRC, the switching signal providing circuit SWC, and the supply voltage providing circuit SPC. In an embodiment, the control circuit CTC is electrically connected to a target electrode CLD by using a conductive pad (for example, the conductive pad TRP1, TRP2, or TRP3). In some embodiments, the conductive pads may be omitted.

In an embodiment, the target electrodes CLDs are separately disposed opposite to the pixel electrodes ALDs.

In an embodiment, the scan circuit SRC is configured to sequentially output multiple scan signals (for example, scan signals SRN1, SRN2, and SRN3) to pixel circuits in different rows and the control circuit CTC in each frame. In an embodiment, the scan circuit SRC includes scan units SRL SR2, and SR3. The scan units SRL SR2, and SR3 are respectively configured to output the scan signals SRN1, SRN2, and SRN3 to multiple gate lines of the display device 100.

In an embodiment, the switching signal providing circuit SWC is configured to provide a first switching signal SWA and a second switching signal SWB to the control circuit CTC. In an embodiment, in different continuous frame (for example, in a first frame and a second frame that are continuous), the first switching signal SWA has different voltage levels, and the second switching signal SWB has different voltage levels. In an embodiment, in a same frame, a voltage level of the first switching signal SWA is different from a voltage level of the second switching signal SWB. In an embodiment, in a same frame, voltage levels of the first switching signal SWA and the second switching signal SWB remain unchanged.

In an embodiment, the supply voltage providing circuit SPC is configured to provide a first supply voltage VDD and a second supply voltage VSS to the control circuit CTC.

In an embodiment, the control circuit CTC is configured to receive the scan signals SRN1, SRN2, and SRN3, the switching signals SWA and SWB, and the supply voltages VDD and VSS, and configured to selectively provide the first supply voltage VDD or the second supply voltage VSS to a target electrode CLD according to the scan signals SRN1, SRN2, and SRN3 and the switching signals SWA and SWB.

For example, in a first frame, when the control circuit CTC receives the scan signal SRN1, the control circuit CTC provides the supply voltage VSS to a first target electrode CLD1 by using the conductive pad TRP1 according to the scan signal SRN1 and the switching signals SWA and SWB.

Then in the first frame, when the control circuit CTC receives the scan signal SRN2, the control circuit CTC provides the supply voltage VDD to a second target electrode CLD2 by using the conductive pad TRP2 according to the scan signal SRN2 and the switching signals SWA and SWB.

Then in a second frame after the first frame, when the control circuit CTC receives the scan signal SRN1, the control circuit CTC provides the supply voltage VDD to the first target electrode CLD1 by using the conductive pad TRP1 according to the scan signal SRN1 and the switching signals SWA and SWB.

Then in the second frame, when the control circuit CTC receives the scan signal SRN2, the control circuit CTC provides the supply voltage VSS to the second target electrode CLD2 by using the conductive pad TRP2 according to the scan signal SRN2 and the switching signals SWA and SWB.

In this way, a polarity of a target electrode CLD can be reversed according to different frames and scan signals.

In some methods, because a polarity of a pixel electrode ALD is reversed after each frame according to a scan signal, if a polarity of a color filter common electrode CCM is not reversed accordingly, when the color filter common electrode CCM and the pixel electrode ALD have reverse polarities (for example, a voltage level of a target electrode CLD is +5 V, and a voltage level of the pixel electrode ALD is −5 V), liquid crystal molecules LDs keep tilting, and the display device cannot change the width of a view angle as required.

On the contrary, by means of this embodiment of this application, the polarity of the color filter common electrode CCM can be reversed according to different frames and scan signals. Therefore, the problem that the color filter common electrode CCM and the pixel electrode ALD have reverse polarities can be avoided, and the display device 100 can change the width of a view angle as required.

Figure 3:
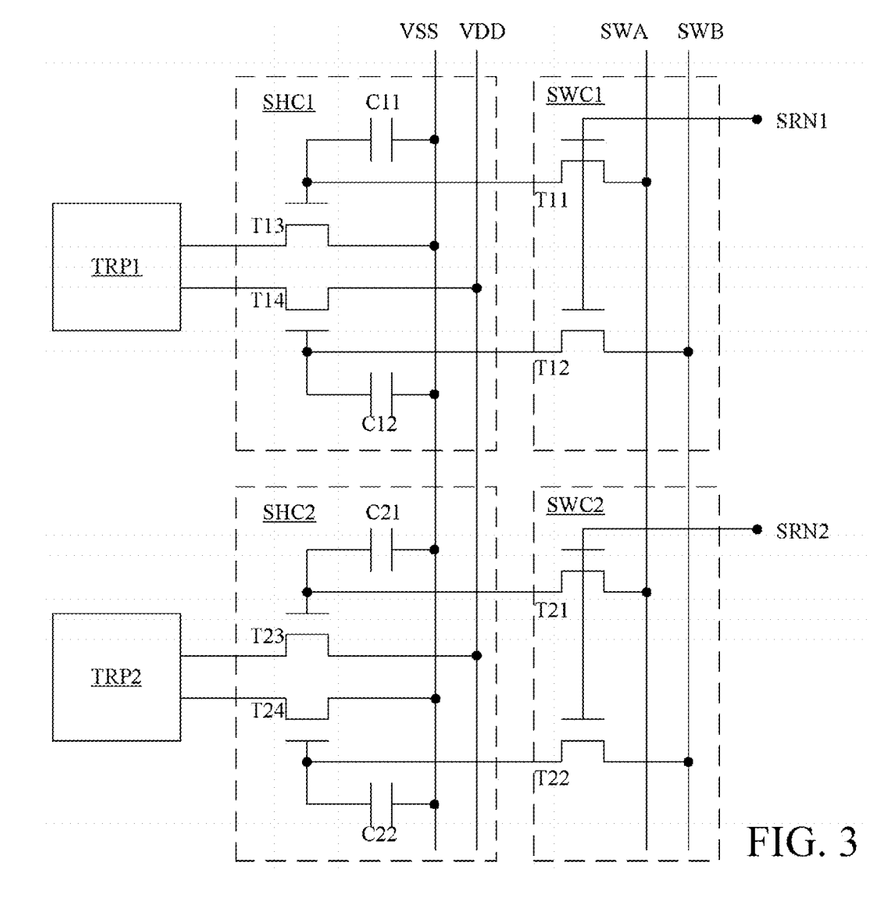
FIG. 3 is a schematic diagram of a control circuit according to an embodiment of this application.

Referring to FIG. 3, in an embodiment, the control circuit CTC includes a switching circuit SWC1 and a select circuit SHC1 that correspond to the scan signal SRN1 and the conductive pad TRP1, and a switching circuit SWC2 and a select circuit SHC2 that correspond to the scan signal SRN2 and the conductive pad TRP2. In an embodiment, the switching circuit SWC1 includes switches T11 and T12, and the switching circuit SWC2 includes switches T21 and T22. In an embodiment, the select circuit SHC1 includes switches T13 and T14 and capacitors C11 and C12, and the select circuit SHC2 includes switches T23 and T24 and capacitors C21 and C22.

In an embodiment, a first end of the switch T11 is configured to receive the switching signal SWA, a second end of the switch T11 is electrically connected to a control end of the switch T13, and a control end of the switch T11 is configured to receive the scan signal SRN1.

In an embodiment, a first end of the switch T12 is configured to receive the switching signal SWB, a second end of the switch T12 is electrically connected to a control end of the switch T14, and a control end of the switch T12 is configured to receive the scan signal SRN1.

In an embodiment, a first end of the switch T13 is configured to receive the second supply voltage VSS, and a second end of the switch T13 is electrically connected to the conductive pad TRP1.

In an embodiment, a first end of the switch T14 is configured to receive the first supply voltage VDD, and a second end of the switch T14 is electrically connected to the conductive pad TRP1.

In an embodiment, two ends of the capacitor C11 are separately electrically connected to the second supply voltage VSS and the control end of the switch T13. In an embodiment, two ends of the capacitor C12 are separately electrically connected to the second supply voltage VSS and the control end of the switch T14.

In an embodiment, a first end of the switch T21 is configured to receive the switching signal SWA, a second end of the switch T21 is electrically connected to a control end of the switch T23, and a control end of the switch T21 is configured to receive the scan signal SRN2.

In an embodiment, a first end of the switch T22 is configured to receive the switching signal SWB, a second end of the switch T22 is electrically connected to a control end of the switch T24, and a control end of the switch T22 is configured to receive the scan signal SRN2.

In an embodiment, a first end of the switch T23 is configured to receive the first supply voltage VDD, and a second end of the switch T23 is electrically connected to the conductive pad TRP2.

In an embodiment, a first end of the switch T24 is configured to receive the second supply voltage VSS, and a second end of the switch T24 is electrically connected to the conductive pad TRP2.

In an embodiment, two ends of the capacitor C21 are separately electrically connected to the second supply voltage VSS and the control end of the switch T23. In an embodiment, two ends of the capacitor C22 are separately electrically connected to the second supply voltage VSS and the control end of the switch T24.

Figure 4:
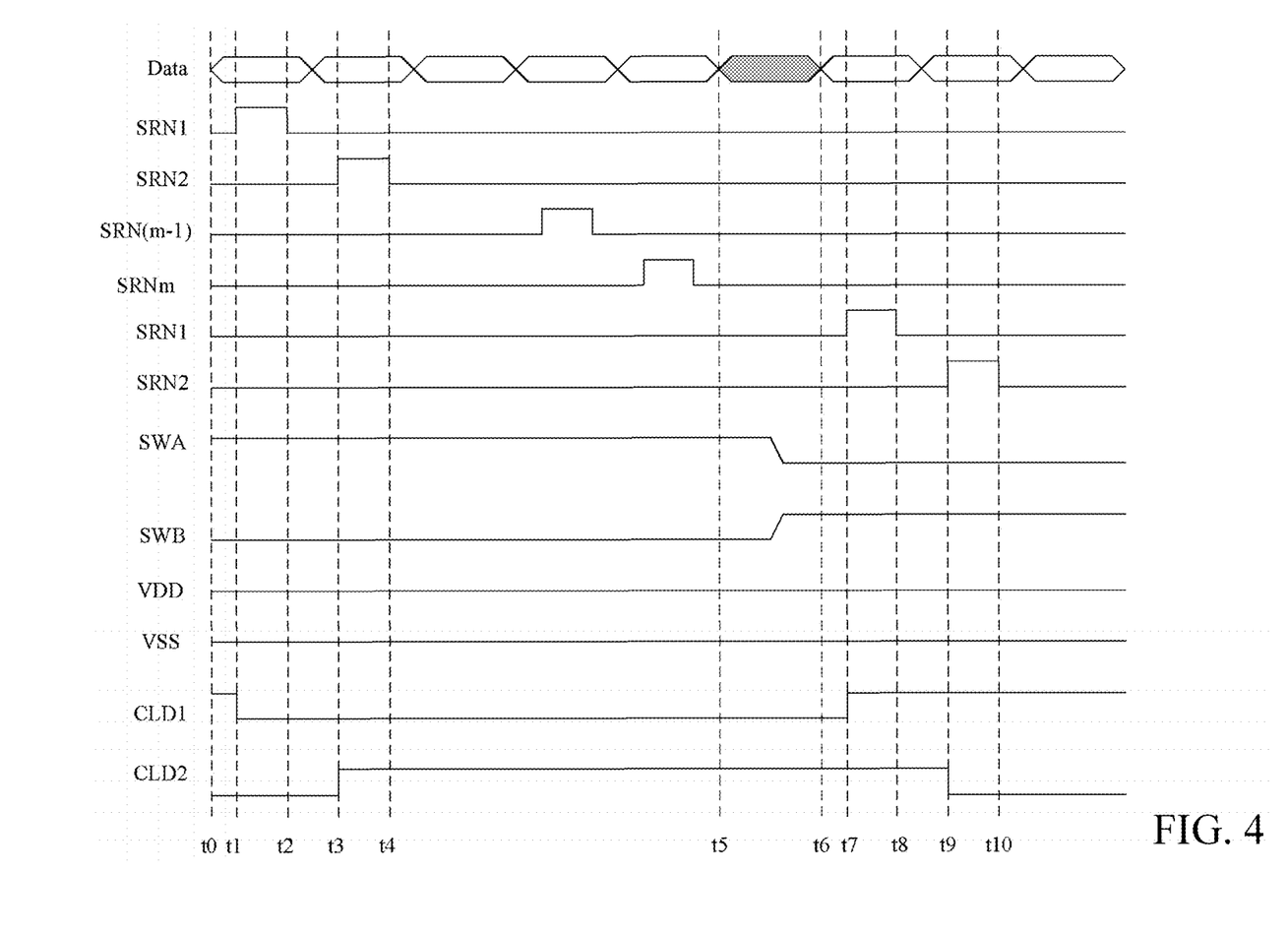
FIG. 4 is a schematic diagram of signals of a display device according to an embodiment of this application.

Referring to FIG. 4, in the first frame (for example, between time points t0 and t5), between time points T1 and t2, the scan signal SRN1 has a high voltage level (for example, 10 V), the scan signal SRN2 has a low voltage level (for example, −8 V), the switching signal SWA has a high voltage level (for example, 8 V), and the switching signal SWB has a low voltage level (for example, −6 V). The switch T11 is switched on according to the scan signal SRN1 having the high voltage level, to provide the switching signal SWA having the high voltage level to the switch T13. The switch T13 is switched on according to the switching signal SWA having the high voltage level, to provide the second supply voltage VSS (whose voltage may be, for example, approximately −3 V to −5 V, and −5 V is used as an example herein) to the target electrode CLD1 by using the conductive pad TRP1. The switch T12 is switched on according to the scan signal SRN1 having the high voltage level, to provide the switching signal SWB having the low voltage level to the switch T14. The switch T14 is switched off according to the switching signal SWB having the low voltage level. The switches T21 and T22 are both switched off according to the scan signal SRN2 having the low voltage level.

Then in the first frame (for example, between the time points t0 and t5), between time points T3 and t4, the scan signal SRN1 has a low voltage level (for example, −8 V), the scan signal SRN2 has a high voltage level (for example, 10 V), the switching signal SWA has a high voltage level (for example, 8 V), and the switching signal SWB has a low voltage level (for example, −6 V). The switches T11 and T12 are both switched off according to the scan signal SRN1 having the low voltage level, and the capacitor C11 maintains the switching signal SWA having the high voltage level for the control end of the switch T13, to keep the switch T13 on. The switch T21 is switched on according to the scan signal SRN2 having the high voltage level, to provide the switching signal SWA having the high voltage level to the switch T23. The switch T23 is switched on according to the switching signal SWA having the high voltage level, to provide the first supply voltage VDD (whose voltage may be, for example, approximately 3 V to 5 V, and 5 V is used as an example herein) to the target electrode CLD2 by using the conductive pad TRP2. The switch T22 is switched on according to the scan signal SRN2 having the high voltage level, to provide the switching signal SWB having the low voltage level to the switch T24. The switch T24 is switched off according to the switching signal SWB having the low voltage level.

Then in the first frame (for example, between the time points t0 and t5), between the time points t4 and t5, the scan signal SRN2 has a low voltage level (for example, −8 V), the switches T21 and T22 are both switched off according to the scan signal SRN2 having the low voltage level, and the capacitor C21 maintains the switching signal SWA having the high voltage level for the control end of the switch T23, to keep the switch T23 on.

Then after the first frame ends and before the second frame starts (for example, between time points t5 and t6), the switching signal providing circuit SWC switches the switching signal SWA from having a high voltage level (for example, 8 V) to having a low voltage level (for example, −6 V), and switches the switching signal SWB from having a low voltage level (for example, −6 V) to having a high voltage level (for example, 8 V). According to an embodiment, a time within which the switching signal providing circuit SWC performs voltage level switching of a switching signal is in a blanking period of the display device 100.

Then in the second frame (for example, after the time point t6), between time points T7 and t8, the scan signal SRN1 has a high voltage level (for example, 10 V), the scan signal SRN2 has a low voltage level (for example, −8 V), the switching signal SWA has a low voltage level (for example, −6 V), and the switching signal SWB has a high voltage level (for example, 8 V). The switch T11 is switched on according to the scan signal SRN1 having the high voltage level, to provide the switching signal SWA having the low voltage level to the switch T13. The switch T13 is switched off according to the switching signal SWA having the low voltage level. The switch T12 is switched on according to the scan signal SRN1 having the high voltage level, to provide the switching signal SWB having the high voltage level to the switch T14. The switch T14 is switched on according to the switching signal SWB having the high voltage level, to provide the supply voltage VDD (whose voltage may be, for example, approximately 3 V to 5 V, and 5 V is used as an example herein) to the target electrode CLD1 by using the conductive pad TRP1. The switches T21 and T22 are both switched off according to the scan signal SRN2 having the low voltage level.

Then in the second frame (for example, after the time point t6), between time points T9 and t10, the scan signal SRN1 has a low voltage level (for example, −8 V), the scan signal SRN2 has a high voltage level (for example, 10 V), the switching signal SWA has a high voltage level (for example, 8 V), and the switching signal SWB has a low voltage level (for example, −6 V). The switches T11 and T12 are both switched off according to the scan signal SRN1 having the low voltage level, and the capacitor C12 maintains the switching signal SWB having the high voltage level for the control end of the switch T14, to keep the switch T14 on. The switch T21 is switched on according to the scan signal SRN2 having the high voltage level, to provide the switching signal SWA having the low voltage level to the switch T23, to switch off the switch T23. The switch T22 is switched on according to the scan signal SRN2 having the high voltage level, to provide the switching signal SWB having the high voltage level to the switch T24. The switch T24 is switched on according to the switching signal SWB having the high voltage level, to provide the supply voltage VSS (whose voltage may be, for example, approximately −3 V to −5 V, and −5 V is used as an example herein) to the target electrode CLD2 by using the conductive pad TRP2.

Then in the second frame (for example, after the time point t6), after the time point t10, the scan signal SRN2 has a low voltage level (for example, −8 V), the switches T21 and T22 are both switched off according to the scan signal SRN2 having the low voltage level, and the capacitor C22 maintains the switching signal SWB having the high voltage level for the control end of the switch T24, to keep the switch T24 on.

Figure 5:
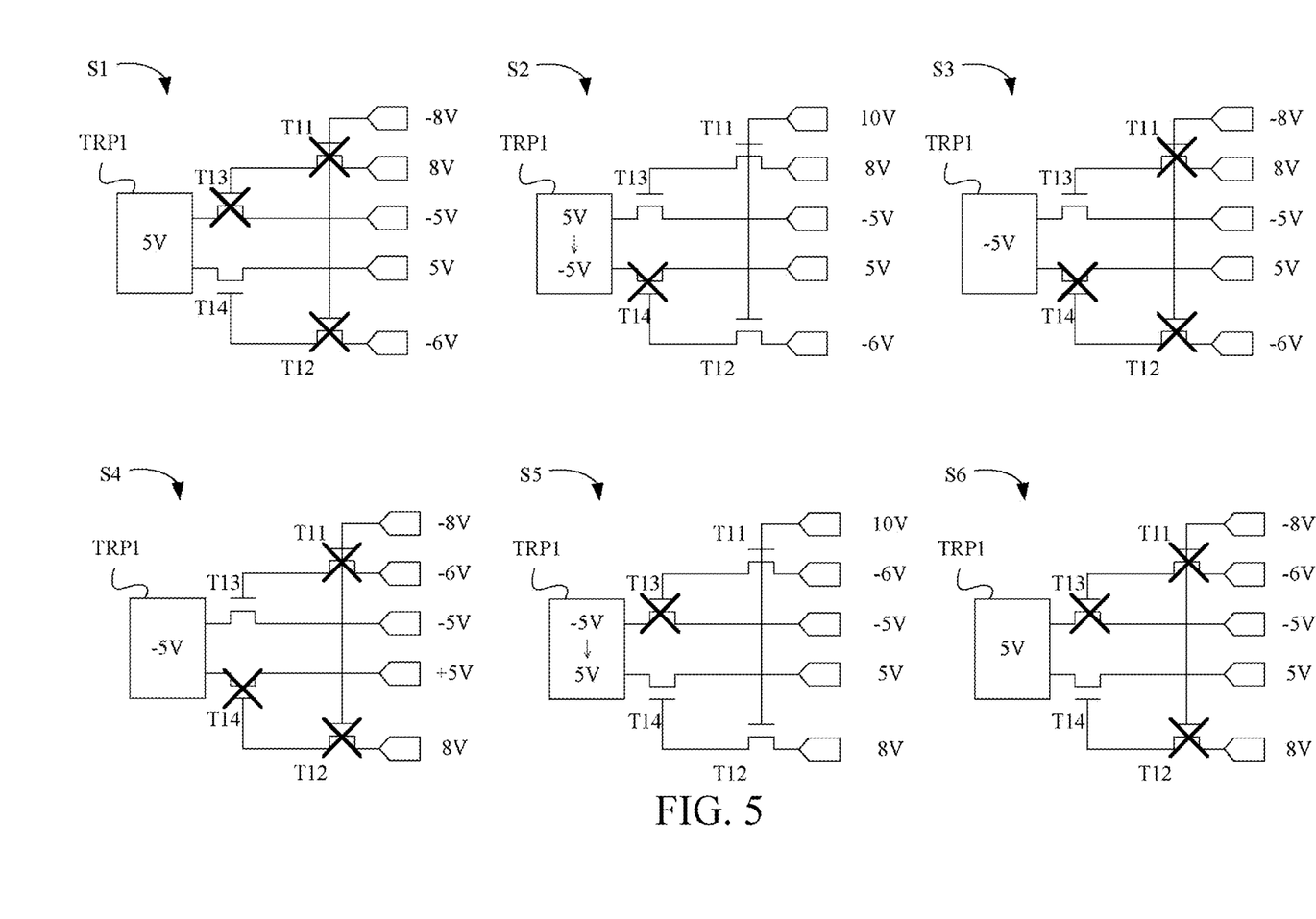
FIG. 5 is schematic diagrams of operations of a control circuit according to an embodiment of this application.

Referring to FIG. 5, FIG. 5 provides schematic diagrams of operation statuses of the switching circuit SWC1 and the select circuit SHC1 in an embodiment. In an operation S1 (corresponding to the time between the time points t0 and T1 in FIG. 4), the switch T14 is switched on, to provide a +5 V supply voltage VDD to the conductive pad TRP1. It should be noted that, for ease of description, in this paragraph, FIG. 5, and the following paragraphs, the supply voltage VDD is described by using +5 V as an example, the supply voltage VSS is described by using −5 V as an example, the scan signal SRN1 is described by using switching between +10 V and −8 V as an example, and the switching signals SWA and SWB are described by using switching between +8 V and −6 V as an example. However, other values of the supply voltages VDD and VSS, the scan signal SRN1, and the switching signals SWA and SWB also fall within the scope of this application.

In an operation S2 (corresponding to the time between the time points T1 and t2 in FIG. 4), the switch T11 is switched on according to a 10 V scan signal SRN1, to provide an 8 V switching signal SWA to the switch T13. The switch T13 is switched on according to the 8 V switching signal SWA, to provide a −5 V supply voltage VSS to the conductive pad TRP1. The switch T12 is switched on according to the 10 V scan signal SRN1, to provide a −6 V switching signal SWB to the switch T14. The switch T14 is switched off according to the −6 V switching signal SWB.

In an operation S3 (corresponding to the time between the time points t2 and t5 in FIG. 4), the switches T11 and T12 are both switched off according to a −8 V scan signal SRN1. In this case, because the capacitor C11 maintains the voltage level 8 V for the control end of the switch T13, the switch T13 is kept on.

In an operation S4 (corresponding to the time between the time points t6 and t7 in FIG. 4), the switches T11 and T12 are both switched off according to the −8 V scan signal SRN1, and because the capacitor C11 maintains the voltage level 8 V for the control end of the switch T13, the switch T13 is kept on. Different from the operation S3, in this case, the switch T11 receives a −6 V switching signal SWA, and the switch T12 receives an 8 V switching signal SWB.

In an operation S5 (corresponding to the time between the time points T7 and t8 in FIG. 4), the switch T11 is switched on according to the 10 V scan signal SRN1, to provide the −6 V switching signal SWA to the switch T13. The switch T13 is switched off according to the −6 V switching signal SWA. The switch T12 is switched on according to the 10 V scan signal SRN1, to provide the 8 V switching signal SWB to the switch T14. The switch T14 is switched on according to the 8 V switching signal SWB, to provide a +5 V supply voltage VDD to the conductive pad TRP1.

In an operation S6 (corresponding to the time after the time point t8 in FIG. 4), the switches T11 and T12 are both switched off according to the −8 V scan signal SRN1, and because the capacitor C12 maintains the voltage level 8 V for the control end of the switch T14, the switch T14 is kept on.

By means of the foregoing operations, a polarity of a target electrode CLD can be reversed according to different frames and scan signals.

In an embodiment, the display device 100 may set both of the supply voltages VSS and VDD to 0 V, and set the switching signals SWA and SWB to 8 V and constant, so that the liquid crystal molecules LDs in the display device 100 do not tilt, and the display device 100 is in a wide view angle mode.

In an embodiment, the display device 100 may be in a single drive or dual drive mode.

In an embodiment, each of the target electrodes CLD1 and CLD2 may correspond to one or more rows of pixel electrodes ALDs.

Figure 6:
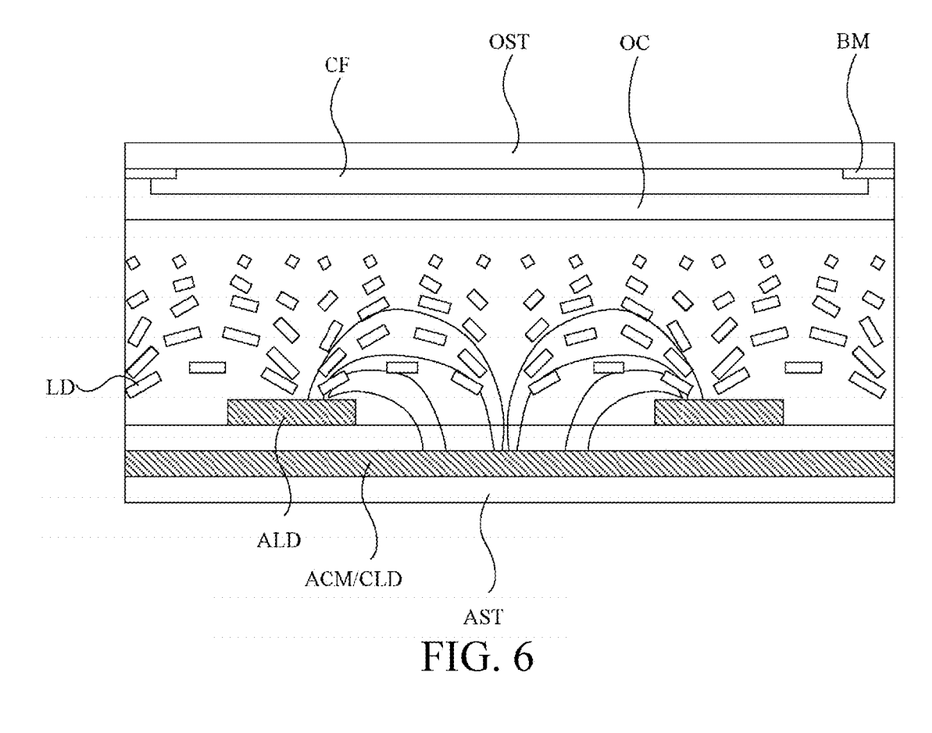
FIG. 6 is a schematic diagram of a display device according to another embodiment of this application.

Referring to FIG. 6, FIG. 6 is a schematic diagram of a display device according to an embodiment of this application. In this embodiment, the display device is basically the same as the display device shown in FIG. 1, and the difference lies in that the display device in this embodiment does not have a color filter common electrode CCM. Therefore, in this embodiment, the display device cannot control tilting of liquid crystal molecules LDs by using an electric field formed between a pixel electrode ALD and a color filter common electrode CCM, to change the width of a view angle of the display device.

Figure 7:
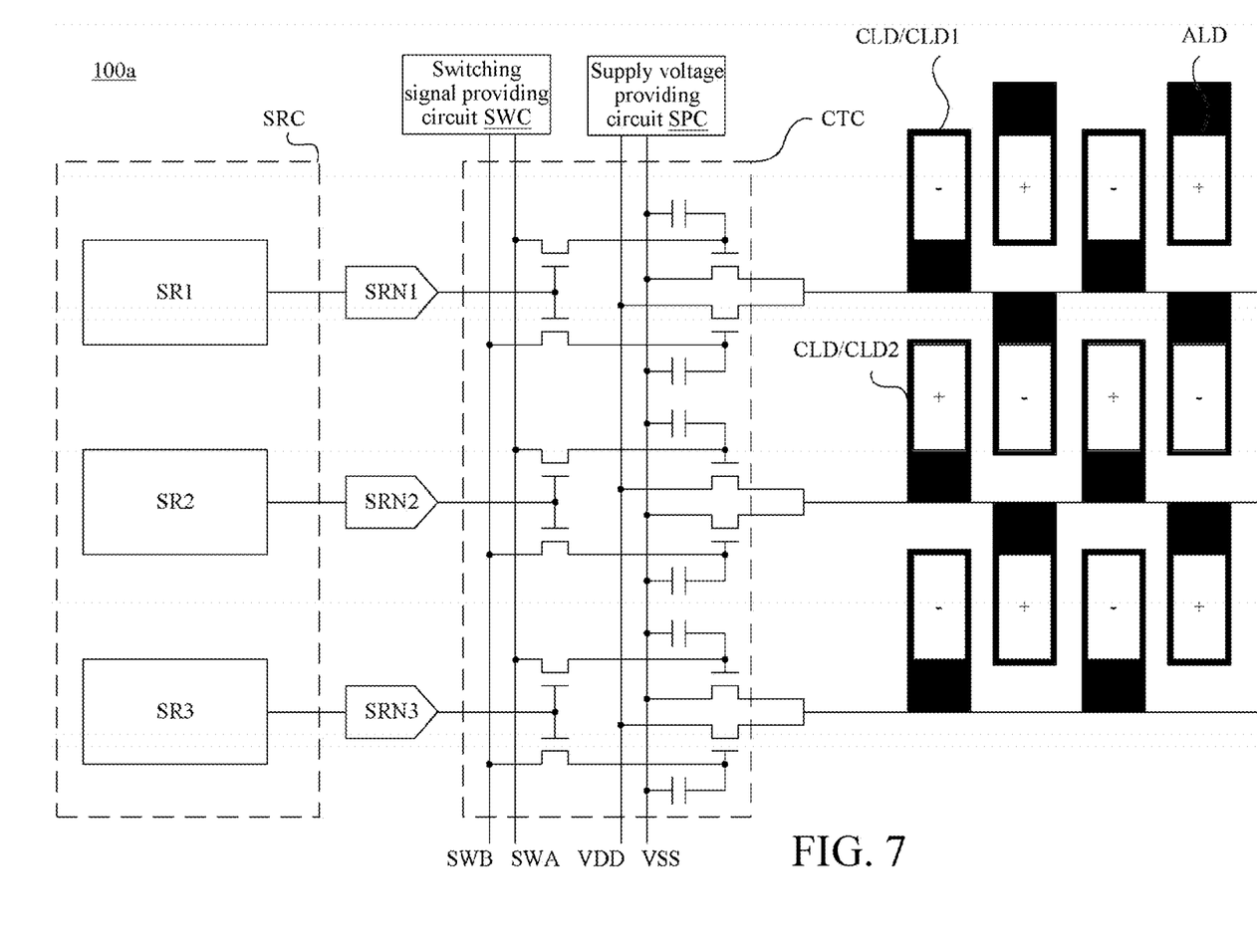
FIG. 7 is a schematic diagram of a display device according to another embodiment of this application.

FIG. 7 is a schematic diagram of a display device 100a according to an embodiment of this application. In this embodiment, the display device 100a includes a scan circuit SRC, a switching signal providing circuit SWC, a supply voltage providing circuit SPC, a control circuit CTC, multiple target electrodes CLDs (which, for example, may be array common electrodes ACMs in FIG. 1 or FIG. 6), pixel electrode ALDs, conductive pads (for example, conductive pads TRP1, TRP2, and TRP3), and multiple pixel circuits (not shown) arranged as a matrix.

In this embodiment, the display device 100a is basically the same as the display device 100 shown in FIG. 2, and similar parts are not described herein again. In this embodiment, the difference between the display device 100a and the display device 100 lies in that the target electrodes CLDs in the display device 100a are array common electrodes ACMs rather than color filter common electrodes CCMs. Refer to the foregoing paragraphs for other related details, which are not described herein again.

In this way, a polarity of an array common electrode ACM can be reversed according to different frames and scan signals. In this way, the display device 100a can provide a low voltage level to a pixel electrode ALD. For example, if a change range of a gray-scale voltage is 5 V, in the case of a positive polarity, the array common electrode ACM is +2.5 V, and the pixel electrode ALD may change from +2.5 V to −2.5 V according to a display requirement; in the case of a negative polarity, the array common electrode ACM is −2.5 V, and the pixel electrode ALD may change from +2.5 V to −2.5 V according to a display requirement. Therefore, the display device 100a needs to provide only a voltage level from +2.5 V to −2.5 V to the pixel electrode ALD.

On the contrary, if the array common electrode ACM is kept 0 V, and a polarity is not reversed (as described in the embodiment in FIG. 2), if a change range of a gray-scale voltage is 5 V, in the case of a positive polarity, the pixel electrode ALD needs to change from +5 V to 0 V; in the case of a negative polarity, the pixel electrode ALD needs to change from −5 V to 0 V. In this case, the display device 100a needs to provide a voltage level from +5 V to −5 V to the pixel electrode ALD.

Figure 8:
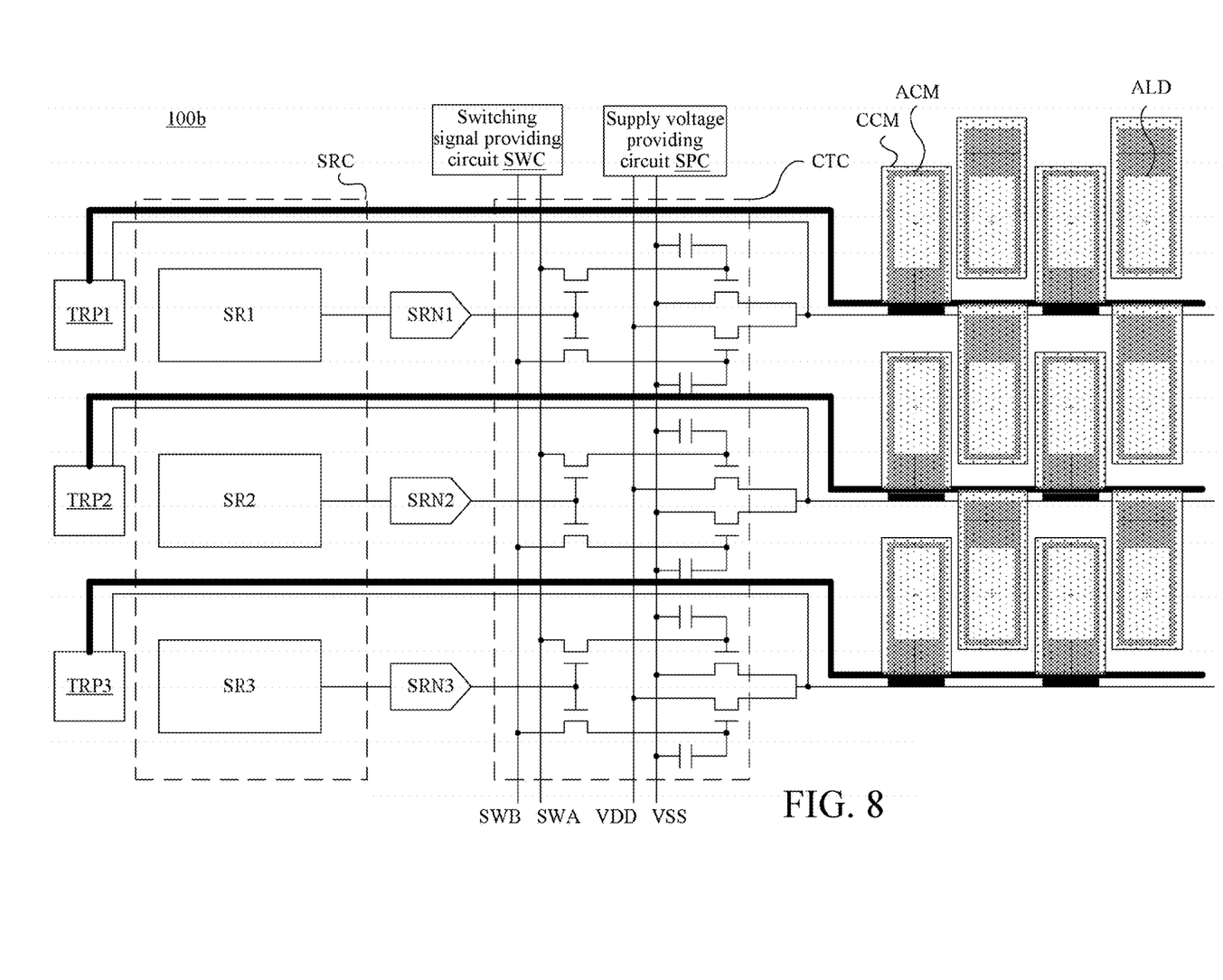
FIG. 8 is a schematic diagram of a display device according to another embodiment of this application.

FIG. 8 is a schematic diagram of a display device 100b according to an embodiment of this application. In this embodiment, the display device 100b includes a scan circuit SRC, a switching signal providing circuit SWC, a supply voltage providing circuit SPC, a control circuit CTC, multiple color filter common electrodes CCMs (which may be color filter common electrodes CCMs in FIG. 1), multiple array common electrodes ACMs (which may be color filter common electrodes CCMs in FIG. 1), pixel electrode ALDs, conductive pads (for example, conductive pads TRP1, TRP2, and TRP3), and multiple pixel circuits (not shown) arranged as a matrix.

In this embodiment, the display device 100b is basically the same as the display device 100a shown in FIG. 7, and similar parts are not described herein again. In this embodiment, the difference between the display device 100b and the display device 100a lies in that the display device 100b further includes the color filter common electrodes CCMs, and besides controlling the array common electrodes ACMs for polarity reversal, the display device 100b also controls the color filter common electrodes CCMs for polarity reversal. Refer to the foregoing paragraphs for other related details, which are not described herein again.

In this way, polarities of an array common electrode ACM and a color filter common electrode CCM can be reversed according to different frames and scan signals.

For example, in the case of a wide view angle and a positive polarity, the display device 100b may set the color filter common electrode CCM to −2.5 V, and set the array common electrode ACM to −2.5 V. In this case, a pixel electrode ALD needs to change from +2.5 V to −2.5 V according to a display requirement. In the case of a narrow view angle and a negative polarity, the display device 100b may set the color filter common electrode CCM to +2.5 V, and set the array common electrode ACM to +2.5 V. In this case, a pixel electrode ALD needs to change from −2.5 V to +2.5 V according to a display requirement.

In addition, in the case of a narrow view angle and a positive polarity, the display device 100b may set the color filter common electrode CCM to +2.5 V, and set the array common electrode ACM to −2.5 V. In this case, a pixel electrode ALD needs to change from +2.5 V to −2.5 V according to a display requirement. In the case of a narrow view angle and a negative polarity, the display device 100b may set the color filter common electrode CCM to −2.5 V, and set the array common electrode ACM to +2.5 V. In this case, a pixel electrode ALD needs to change from −2.5 V to +2.5 V according to a display requirement.

In this way, the display device 100b can change the width of a view angle, and the display device 100b needs to provide only a voltage level from +2.5 V to −2.5 V to the pixel electrode ALD.

Although the present invention is disclosed by using the foregoing embodiments, these embodiments are not intended to limit the present invention. Various changes and modifications made without departing from the spirit and scope of the present invention shall fall within the protection scope of the present invention. The protection scope of the present invention is subject to the appended claims.

What is claimed is:

1. A display device, comprising:
multiple target electrodes;
a scan circuit having the capacity to sequentially output multiple scan signals in each of multiple frames;
a switching signal providing circuit having the capacity to provide a first switching signal and a second switching signal, wherein in a first frame and a second frame in the multiple frames, the first switching signal has different voltage levels, and the second switching signal has different voltage levels;
a supply voltage providing circuit having the capacity to provide a first supply voltage and a second supply voltage; and
a control circuit having the capacity to receive a first scan signal in the scan signals, and having the capacity to output the first supply voltage to a first target electrode in the target electrodes in the first frame according to the first scan signal, the first switching signal, and the second switching signal, and to output the second supply voltage to the first target electrode in the second frame according to the first scan signal, the first switching signal, and the second switching signal, the control circuit comprising:
a switching circuit, configured to receive the first scan signal, the first switching signal, and the second switching signal, and configured to output the first switching signal and the second switching signal according to the first scan signal; and
a select circuit, configured to receive the first supply voltage, the second supply voltage, and the first switching signal and the second switching signal from the switching circuit, and configured to selectively output the first supply voltage or the second supply voltage to the first target electrode according to the first switching signal and the second switching signal, the select circuit comprising:
- a first switch, having a first end, a second end, and a control end, wherein the first end of the first switch has the capacity to receive the first supply voltage, the second end of the first switch has the capacity to output the first supply voltage to the first target electrode, and the control end of the first switch has the capacity to receive the first switching signal from the switching circuit
- a first capacitor, having a first end and a second end, wherein the first end of the first capacitor has the capacity to receive the first supply voltage, the second end of the first capacitor is electrically connected to the control end of the first switch, and a function of the first capacitor is to maintain the first switching signal;
- a second switch, having a first end, a second end, and a control end, wherein the first end of the second switch has the capacity to receive the second supply voltage, the second end of the second switch has the capacity to output the second supply voltage to the first target electrode, and the control end of the second switch has the capacity to receive the second switching signal from the switching circuit and
- a second capacitor, having a first end and a second end, wherein the first end of the second capacitor has the capacity to receive the first supply voltage, the second end of the second capacitor is electrically connected to the control end of the second switch, and a function of the second capacitor is to maintain the second switching signal;

wherein the control circuit further has the capacity to output the second supply voltage to a second target electrode in the target electrodes in the first frame according to a second scan signal in the scan signals, the first switching signal, and the second switching signal, and output the first supply voltage to the second target electrode in the second frame according to the second scan signal, the first switching signal, and the second switching signal.

2. The display device according to claim 1, wherein the switching circuit comprises:
- a first switch, having a first end, a second end, and a control end, wherein the first end of the first switch is configured to receive the first switching signal, the second end of the first switch is configured to output the first switching signal to the select circuit, and the control end of the first switch is configured to receive the first scan signal; and
- a second switch, having a first end, a second end, and a control end, wherein the first end of the second switch is configured to receive the second switching signal, the second end of the second switch is configured to output the second switching signal to the select circuit, and the control end of the second switch is configured to receive the first scan signal.

3. The display device according to claim 2, wherein the first switch and the second switch are simultaneously switched on or off.

4. The display device according to claim 1, wherein the second switch is switched off when the first switch is switched on, and the second switch is switched on when the first switch is switched off.

5. The display device according to claim 1, further comprising:

an array substrate; and
an opposite substrate, wherein
the target electrodes are disposed on the opposite substrate and/or the array substrate.

6. The display device according to claim 1, wherein in the first frame, a voltage level of the first switching signal is different from a voltage level of the second switching signal, and in the second frame, a voltage level of the first switching signal is different from a voltage level of the second switching signal.

7. The display device according to claim 1, wherein in the first frame, voltage levels of the first switching signal and the second switching signal remain unchanged.

8. The display device according to claim 1, wherein the first target electrode and the second target electrode are neighboring to each other.

9. A display device comprising:
multiple target electrodes;
a scan circuit configured to sequentially output multiple scan signals in each of multiple frames;
a switching signal providing circuit configured to provide a first switching signal and a second switching signal respectively to a first switching signal line and a second switching signal line, such that, in a first frame in the multiple frames, the first switching signal and the second switching signal have respectively a first voltage level and a second voltage level, and, in a second frame adjacent to the first frame in the multiple frames, the first switching signal and the second switching signal have respectively the second voltage level and the first voltage level, wherein the first voltage level and the second voltage level are mutually different, and wherein, in each of said first and second frames, the respective voltage levels of the first switching signal and of the second switching signal remain unchanged;
a supply voltage providing circuit configured to provide a first supply voltage and a second supply voltage respectively to a first supply line and a second supply line; and
a control circuit configured to receive a first scan signal in the scan signals, and to output the first supply voltage to a first target electrode in the target electrodes in the first frame according to the first scan signal, the first switching signal, and the second switching signal, and to output the second supply voltage to the first target electrode in the second frame according to the first scan signal, the first switching signal, and the second switching signal;
wherein the control circuit is further configured to receive a second scan signal adjacent to the first scan signal in the scan signals, and to output the second supply voltage to a second target electrode in the target electrodes in the first frame according to the second scan signal, the first switching signal, and the second switching signal, and to output the first supply voltage to the second target electrode in the second frame according to the second scan signal, the first switching signal, and the second switching signal;
characterized in that the control circuit comprises:
a first select circuit;
a second select circuit;
a first switching circuit; and
a second switching circuit;
wherein the first select circuit comprises:
a first switch, having a first end, a second end, and a control end, wherein the first end of the first switch is electrically connected to the second supply line to receive the second supply voltage, the second end of the first switch is configured to output the second supply voltage to the first target electrode;

a first capacitor, having a first end and a second end, wherein the first end of the first capacitor is electrically connected to the second supply line to receive the second supply voltage, the second end of the first capacitor is electrically connected to the control end of the first switch, and a function of the first capacitor is to maintain the first switching signal;

a second switch, having a first end, a second end, and a control end, wherein the first end of the second switch is electrically connected to the first supply line to receive the first supply voltage, the second end of the second switch is configured to output the first supply voltage to the first target electrode; and a second capacitor, having a first end and a second end, wherein the first end of the second capacitor is electrically connected to the second supply line to receive the second supply voltage, the second end of the second capacitor is electrically connected to the control end of the second switch, and a function of the second capacitor is to maintain the second switching signal;

wherein the second select circuit comprises:

a third switch, having a first end, a second end, and a control end, wherein the first end of the first switch is electrically connected to the first supply line to receive the first supply voltage, the second end of the third switch is configured to output the first supply voltage to the second target electrode in the target electrodes;

a third capacitor, having a first end and a second end, wherein the first end of the third capacitor is electrically connected to the second supply line to receive the second supply voltage, and the second end of the first capacitor is electrically connected to the control end of the third switch;

a fourth switch, having a first end, a second end, and a control end, wherein the first end of the fourth switch is electrically connected to the second supply line to receive the second supply voltage, the second end of the fourth switch is configured to output the second supply voltage to the second target electrode; and a fourth capacitor, having a first end and a second end, wherein the first end of the fourth capacitor is electrically connected to the second supply line to receive the second supply voltage, and the second end of the fourth capacitor is electrically connected to the control end of the fourth switch;

wherein the first switching circuit is configured to receive the first scan signal, to receive the first switching signal and the second switching signal respectively from the first switching signal line and the second switching signal line, and to output the first switching signal and the second switching signal respectively to the control end of the first switch and the control end of the second switch according to the first scan signal;

wherein the second switching circuit is configured to receive the second scan signal, to receive the first switching signal and the second switching signal respectively from the first switching signal line and the second switching signal line, and to output the first switching signal and the second switching signal respectively to the control end of the third switch and the control end of the fourth switch according to the second scan signal.

* * * * *